(12) United States Patent
Loffink et al.

(10) Patent No.: US 10,457,139 B2
(45) Date of Patent: Oct. 29, 2019

(54) FUEL CAP AND SPRING ASSEMBLY

(71) Applicants: John Loffink, Damascus, OR (US); Bob Klein, Gresham, OR (US)

(72) Inventors: John Loffink, Damascus, OR (US); Bob Klein, Gresham, OR (US)

(*) Notice: Subject to any disclaimer, the term of this patent is extended or adjusted under 35 U.S.C. 154(b) by 574 days.

(21) Appl. No.: 15/010,243

(22) Filed: Jan. 29, 2016

(65) Prior Publication Data

US 2017/0217308 A1 Aug. 3, 2017
US 2018/0194222 A9 Jul. 12, 2018

Related U.S. Application Data

(63) Continuation-in-part of application No. 14/657,342, filed on Mar. 13, 2015.

(51) Int. Cl.
*B60K 15/04* (2006.01)

(52) U.S. Cl.
CPC ...... *B60K 15/0406* (2013.01); *B60K 15/0409* (2013.01); *B60K 2015/0451* (2013.01); *B60Y 2200/14* (2013.01); *B60Y 2306/01* (2013.01)

(58) Field of Classification Search
CPC ........ B60K 15/0406; B60K 2015/0451; B60K 15/0409
USPC ................................................. 220/86.1, 86.2
See application file for complete search history.

(56) References Cited

U.S. PATENT DOCUMENTS

| | | | | |
|---|---|---|---|---|
| 4,732,288 A | * | 3/1988 | Morris, Sr. | B65D 50/045 215/214 |
| 6,176,381 B1 | * | 1/2001 | Mader | B65D 50/067 215/217 |
| 7,837,051 B2 | * | 11/2010 | Broadhead | E05B 73/0023 206/387.11 |
| 8,286,819 B1 | * | 10/2012 | Morris, Jr. | B65D 50/048 220/326 |

* cited by examiner

*Primary Examiner* — Jeffrey R Allen
(74) *Attorney, Agent, or Firm* — Ingrid McTaggart (57) ABSTRACT

The present invention provides a fuel cap including a body and a spring positioned on the body that inhibits unintended removal of the cap from a fuel filler neck, the spring secured on the cap by a cam pin that is used to secure the cap on the cam ramp of a fuel filler neck.

14 Claims, 8 Drawing Sheets

FUEL CAP AND SPRING ASSEMBLY

This application is a continuation-in-part of U.S. patent application Ser. No. 14/657,342, filed on Mar. 13, 2015, in the name of inventor John A. Loffink.

TECHNICAL FIELD

The present invention relates to a fuel cap and spring assembly, and a process of manufacturing the same, for use in commercial vehicles, and more particularly, to a fuel cap and spring assembly that includes an improved spring that eliminates many components of prior art fuel cap assemblies.

BACKGROUND OF THE INVENTION

Fuel tank caps, also called filler cap assemblies, may be used for sealing the opening of a fuel tank of a vehicle, such as a commercial trucking vehicle. Fuel caps typically are placed on the fuel tank opening and are locked in place to create an airtight seal over the opening. It may be desirable that the airtight seal be maintained during operation of the vehicle so that fuel or fuel vapor is not lost to the atmosphere and so that spillage of the fuel does not occur. Accordingly, it may be desirable that the seal and the locking mechanism be sturdy enough to withstand the harsh environmental conditions of commercial vehicle usage such as extreme weather conditions and continued vibration of the fuel tank and cap during operation of the vehicle. Moreover, it may be desirable that fuel caps are secured on the fuel tank opening during a sudden impact to the fuel tank, such as during a collision, so that the cap is not dislodged and fuel is not discharged, which may result in a fire or an explosion.

SUMMARY OF THE INVENTION

The present invention provides a fuel cap including a body and a spring positioned on the body, the cap adapted for engaging a filler tube opening, and the spring positioned on the cap body such that the spring hinders removal of the cap from the fuel filler neck to secure the cap to the fuel filler neck.

DETAILED DESCRIPTION OF THE DRAWINGS

Figures 1, 2:
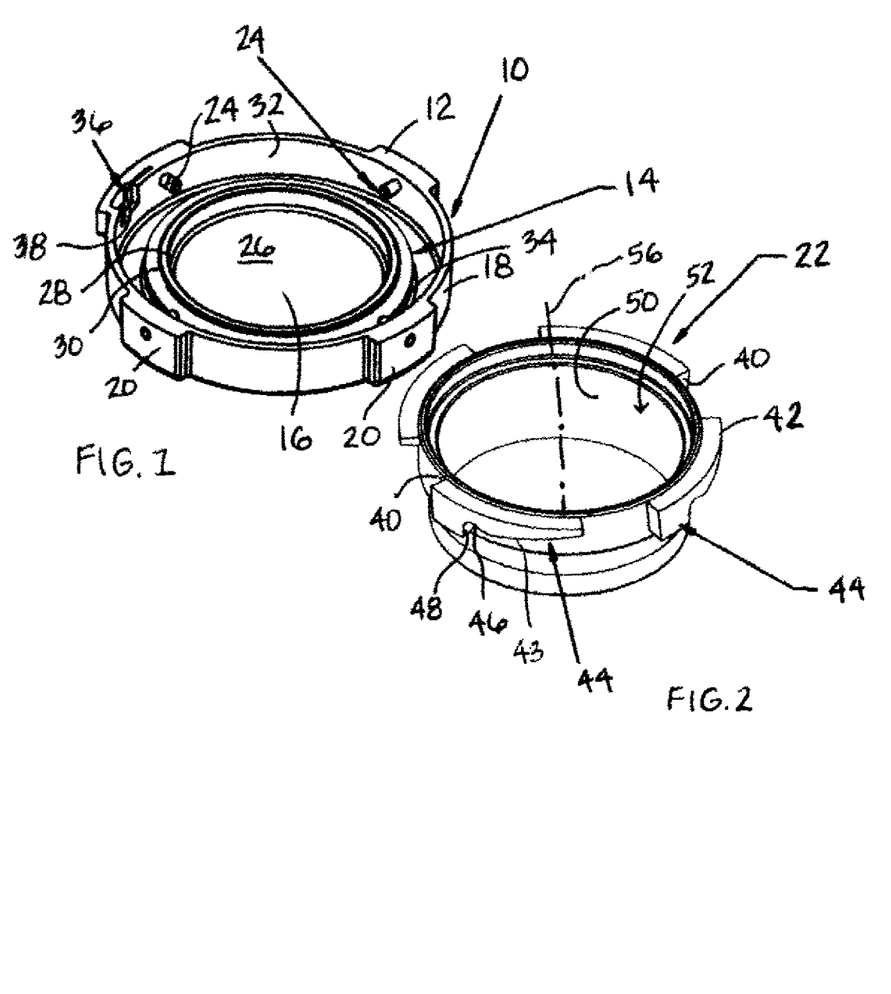
FIG. 1 is an isometric bottom view of one example embodiment of a fuel cap.
FIG. 2 is an isometric top view of one example embodiment of a fuel filler neck on which the cap of FIG. 1 may be secured.

FIG. 1 is an isometric bottom view of one example embodiment of a fuel cap 10. Cap 10 includes a body 12 and a seal 14 positioned on body 12. Body 12 includes a generally planar expanse 16 with a downwardly extending shoulder 18 (shown extending upwardly in this bottom view drawing) positioned around expanse 16. Shoulder 18 includes several outwardly extending portions 20 that allow a user to easily grip the cap 10 when securing the cap to or removing the cap from a fuel filler neck 22 (FIG. 2). In this embodiment, each of four outwardly extending portions 20 include a cam pin 24 that extends inwardly into an interior 26 of cap 10. The cam pin may be referred to as a cylindrical, elongate member such as a pin, a set screw, or the like.

Still referring to FIG. 1, generally planar expanse 16 includes a downwardly extending shoulder 28 that, in this embodiment, is circular in shape. The shoulder 28 defines an outer surface 30 that faces an inner surface 32 of shoulder 18. In the embodiment shown, outer surface 30 and inner surface 32 may be positioned parallel to one another and perpendicular to planar expanse 16. Body 12 of cap 10 may further include a seal seating surface 34 that is positioned on planar expanse 16 and around outer surface 30 of downwardly extending shoulder 28.

In the embodiment shown, seal 14 is an O-ring that is positioned on seating surface 34 and outer surface 30 of shoulder 28. O-ring seal 14 defines a cross sectional shape that is circular, such that seal 14 may "roll" slightly upwardly or downwardly along outer surface 30 of shoulder 28. In another embodiment seal 14 may have an elongate oval cross sectional shape. In still another embodiment seal 14 may comprise a band having a generally rectangular cross sectional shape.

Still referring to FIG. 1, body 12 may further comprise one or more leaf springs 36 secured within one or more of outwardly extending portions 20, and extending inwardly into interior 26 of cap 12. Spring 36 may include a curved portion 38 that is received within an indentation 40 (FIG. 2) of a perimeter 42 of fuel filler neck 22 such that spring 36 acts to retain cap 10 on fuel filler neck 22 when the cap is secured on filler neck 22. Spring 36 may hinder loosening of cap 10 on fuel filler neck 22 due to vibration of the cap 10 during normal operating conditions of a vehicle to which the cap is secured.

FIG. 2 is an isometric top view of one example embodiment of a fuel filler neck 22 on which the cap 10 of FIG. 1 may be secured. Neck 22 includes cam ramps 44 on an outer perimeter 42 of the fuel filler neck 22, the cam ramps defining a downwardly facing surface 43 on fuel filler neck 22. Ramps 44 generally match the number and configuration of cam pins 24 of cap 10 (FIG. 1) such that each of cam ramps 44 are positioned to receive a corresponding one of cam pins 24 along surface 43. Each cam ramp 44 may terminate in a depression 46 and a stop surface 48 that separately or together retain a cam pin 24 there against when the cap 10 is secured on fuel filler neck 22.

Fuel filler neck 22 further includes an inner surface 50, also referred to as an inner diameter surface, that defines an opening 52 for receiving a fuel nozzle during filling of a fuel tank to which fuel filler neck 22 is attached. Inner surface 50 of neck 22 may be sloped, such as defining an angle 54 (FIG. 8) in a range of 0.001 to twenty degrees, and approximately two degrees, with respect to an elongate axis 56 of opening 52. Securing cap 10 on fuel filler neck 22 will now be described.

To secure cap 10 on neck 22, the cap is positioned with cam pins 24 and seal 14 facing towards fuel filler neck 22. The cap 10 is lowered onto neck 22 such that cam pins 24 are positioned within indentations 40 between cam ramps 44. The cap 10 is lowered until seal 14 first engages inner surface 50 of fuel filler neck 22. The cap is then turned in a clock wise direction relative to fuel filler neck 22 such that cam pins 24 engage surface 43 of cam ramps 44 and then begin to move downwardly along surface 43 of cam ramps 44. As cap 10 is turned clock wise on neck 22, and as cam pins 24 move along surface 43 of cam ramps 44, the cap 10 will be pulled downwardly on to fuel filler neck 22, and seal 14 will be pulled into contact with inner surface 50 of fuel filler neck 22. Cap 10 is continually turned on fuel filler neck 22 until cam pins 24 are received within depressions 46 and against stop surfaces 48 of neck 22. In this position, seal 14 will be compressed slightly between inner surface 50 of neck 22 and outer surface 30 of shoulder 28 of cap 10. Stop or seating surface 34 will inhibit the seal from moving upwardly and out of contact with outer surface 30 of the cap and inner surface 50 of the fuel filler neck 22. Accordingly, seal 14 is secured between two surfaces, 30 and 50, that are positioned substantially parallel to elongate axis 56 of fuel filler neck 22, instead of between two surfaces that are position perpendicular to an elongate axis of a fuel filler neck 22. The slight angle 54 of inner surface 50 of neck 22 acts to squeeze seal 14 between surfaces 50 and 30 as the cap 10 is pulled downwardly by cam pins 24 moving along cam ramps 44. In this manner cap 10 is secured to neck 22 and provides a seal between an inner diameter of the neck 22 and the cap 10, instead of on a top surface of neck 22, as in the prior art.

Figure 3:
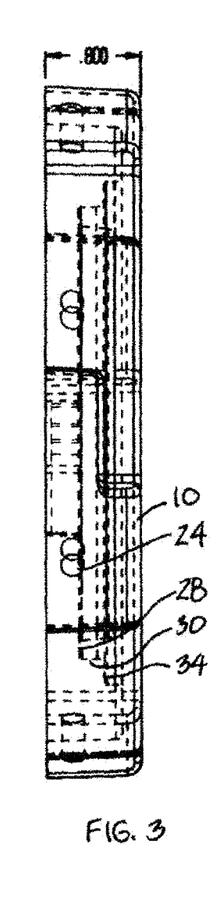
FIG. 3 is a side view of the cap of FIG. 1.

FIG. 3 is a side view of the cap 10 of FIG. 1 showing outer surface 30 and seating surface 34 of shoulder 28.

Figure 4:
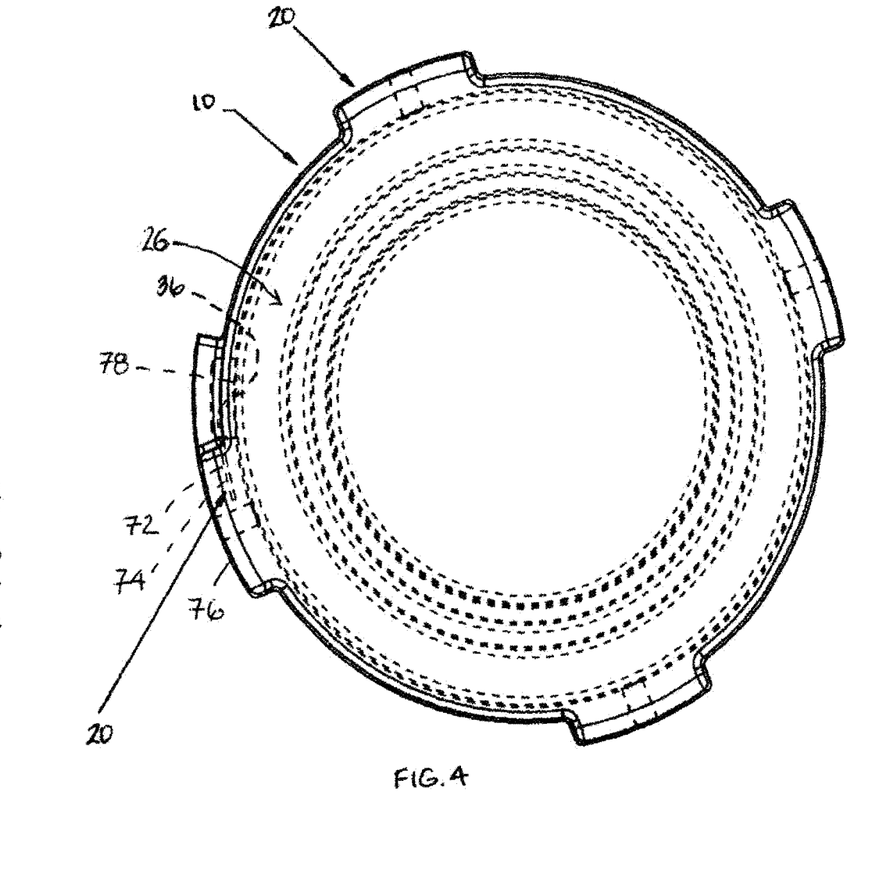
FIG. 4 is a plan view of the cap of FIG. 1.

FIG. 4 is a plan view of the cap 10 of FIG. 1 showing spring 36 and outwardly extending portions 20. Spring 36 is shown having a first end region 72 positioned within a groove 74 cut into one 76 of portions 20 of the cap. A second end region 78 of spring 36 is shown extending outwardly of groove 74 and into an interior 26 of cap 10, so as to be positioned within an indentation 40 (FIG. 2) of fuel filler neck 22 (FIG. 2) in a closed or secured position of the cap 10 on fuel filler neck 22. In this embodiment first end region 72 of spring 36 may be secured within groove 74 of cap 10 by friction, adhesive, welding, or any other known securement device or method.

Figures 5, 6:
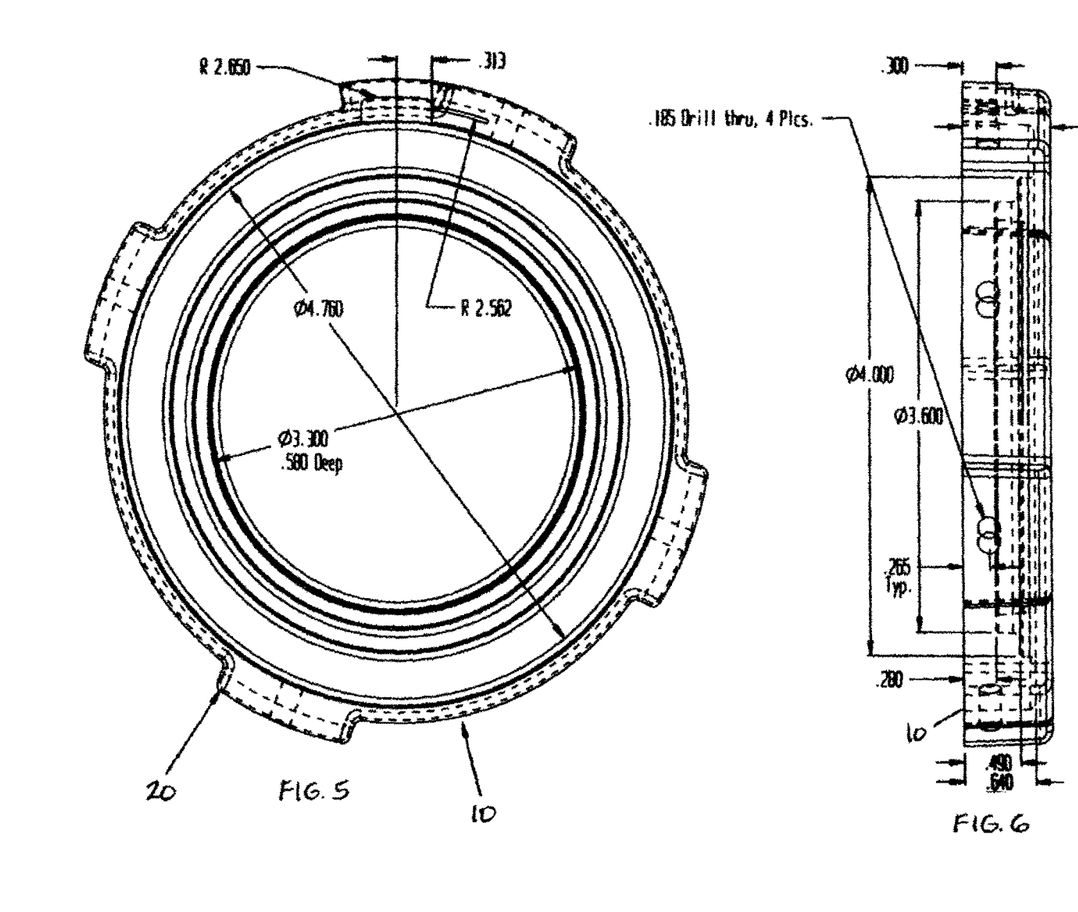
FIG. 5 is a bottom view of the cap of FIG. 1.
FIG. 6 is a side view of the cap of FIG. 5

FIG. 5 is a bottom view of the cap 10 of FIG. 1.

FIG. 6 is a side view of the cap 10 of FIG. 5.

Figure 7:
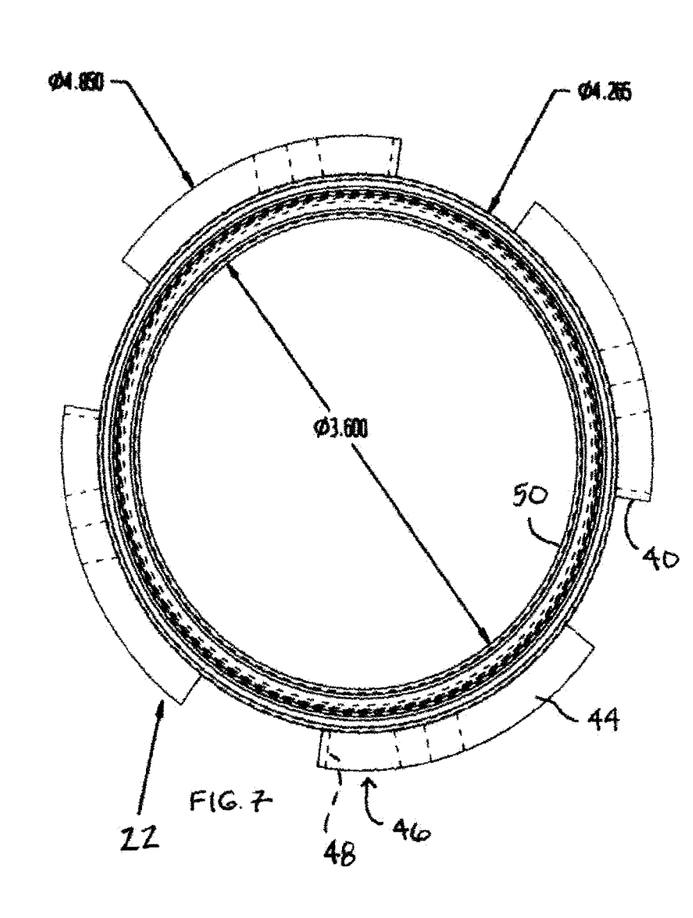
FIG. 7 is plan view of the fuel filler neck of FIG. 2.

FIG. 7 is plan view of the fuel filler neck 22 of FIG. 2.

Figure 8:
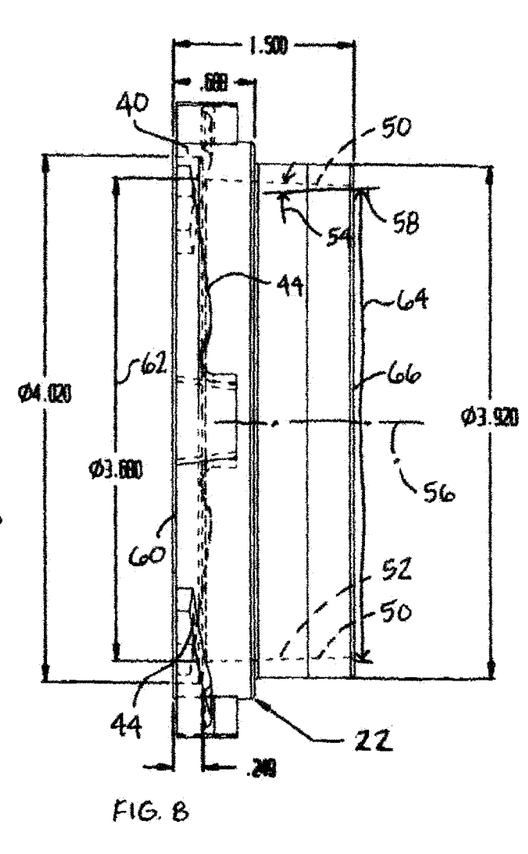
FIG. 8 is a side view of the fuel filler neck of FIG. 7.

FIG. 8 is a side view of the fuel filler neck 22 of FIG. 7 showing cam ramps 44 and indentations 40. In this view, angle 54 is shown as the angle of surface 50 with respect to a line 58 that is parallel to elongate axis 56. Accordingly, inner surface 50 of neck 22 defines an opening 52 of neck 22 that decreases in diameter as the position of the measurement is taken further away from a top surface 60 of neck 22. In other words, a diameter 62 of opening 52 at top surface 60 is larger than a diameter 64 of opening 52 at a bottom surface 66 of neck 22.

Figure 9:
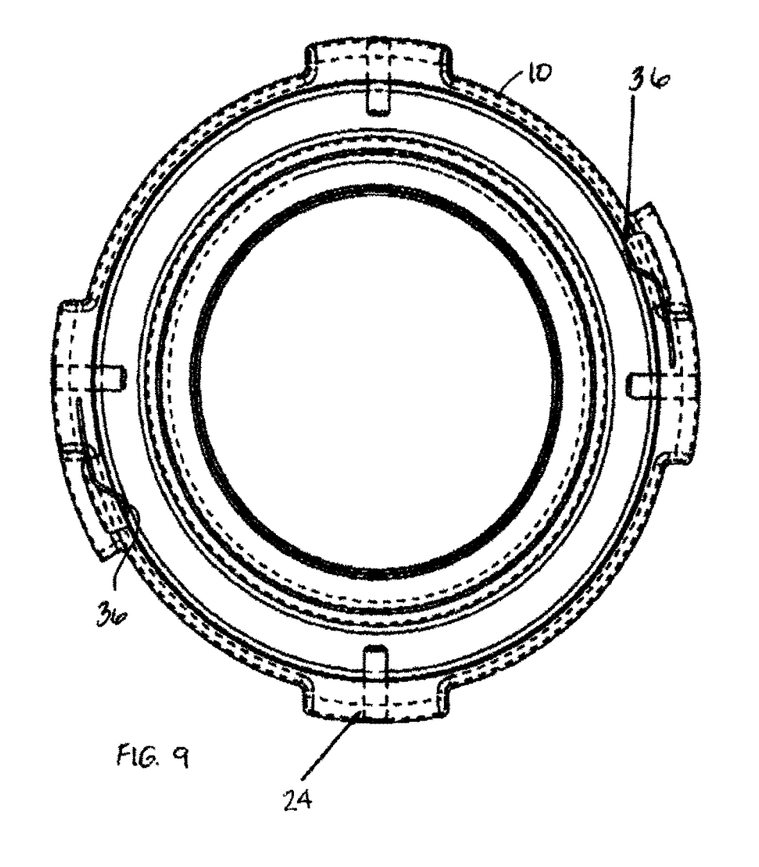
FIG. 9 is a bottom view of another example embodiment of a fuel cap.

FIG. 9 is a bottom view of another example embodiment of a fuel cap 10. In this embodiment, cap 10 includes two springs 36 positioned diametrically opposed to one another across cap 10. The two springs 36 together act to retain cap 10 on a fuel filler neck 22 during use.

Figure 10:
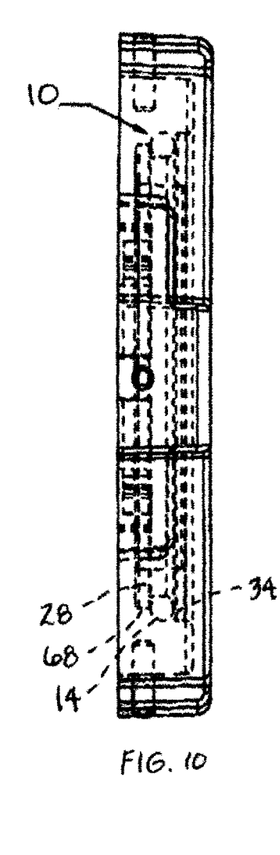
FIG. 10 is a side view of the cap of FIG. 9.

FIG. 10 is a side view of cap 10 of FIG. 9. In this embodiment, shoulder 28 of cap 10 may include a radially extending portion 68 that extends radially outwardly and over seal 14 to retain seal 14 between extending portion 68 and seating surface 34. In this embodiment, radially extending portion 68 extends a distance over seal 14 approximately one half a diameter of seal 14. In other embodiments, portion 68 may extend over seal 14 another distance as may be desired for a particular embodiment. Radially extending portion 68 may hinder seal 14 from being removed from outer surface 30 and cap 10 when the cap is removed from a fuel filler neck 22. In other words, when cap 10 is removed from a fuel filler neck 22, radially extending portion 68 retains seal 14 on cap 10, rather than allowing the seal to remain on neck 22 when the cap 10 is removed from neck 22. However, seal 14 may be manufactured with an elasticity such that an operator may pull seal 14 over portion 68 and off of cap 10 to replace seal 14 with a new seal if the old seal 14 becomes worn or damaged. In this manner, cap 10 may be repaired in a short time period and with a relatively low cost when compared with prior art cap assemblies.

A benefit of the present invention is that cap 10, with seal 14 positioned thereon, may be secured on existing cam design fuel filler necks 22. Accordingly, the improved sealing method and apparatus of the present invention, wherein the cap 10 seals a fuel filler neck 22 on an inner surface 50 or diameter of the neck 22, may be secured on an existing fuel filler neck 22 without changing out the existing neck 22 of the fuel tank. Moreover, the cap 10 of the present invention may utilize less materials to manufacture, and may utilize a seal having a much more simple and elegant design, when compared to seals and cap designs of the prior art. Accordingly, replacement of seal 14 of cap 10 may be easy and inexpensive when compared to seal replacement requirements of prior art fuel filler caps.

Figure 11:
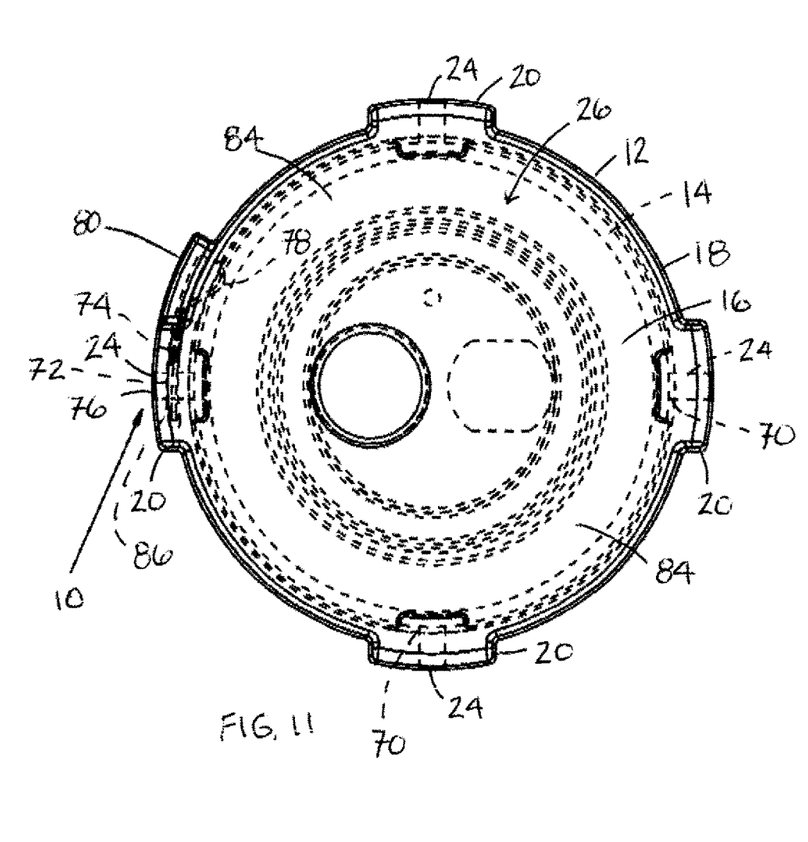
FIG. 11 is top view of one example embodiment of a fuel cap with a spring secured thereon.

FIG. 11 is a top view of one example embodiment of a fuel cap 10. Cap 10 includes a body 12 and a seal 14 positioned on body 12. Body 12 includes a generally planar expanse 16 with a downwardly extending shoulder 18 positioned around expanse 16. Shoulder 18 includes several outwardly extending portions 20 that allow a user to easily grip the cap 10 when securing the cap to or removing the cap from a fuel filler neck 22 (FIG. 2). In this embodiment, each of four outwardly extending portions 20 include a cam pin 24 that extends inwardly into an interior 26 of cap 10. Accordingly, an inwardly extending portion 70 of each of cam pins 24 are positioned to move along a cam ramp 44 (FIG. 2) of a fuel filler neck 22 (FIG. 2) so as to retain cap 10 on fuel filler neck 22.

Figure 12:
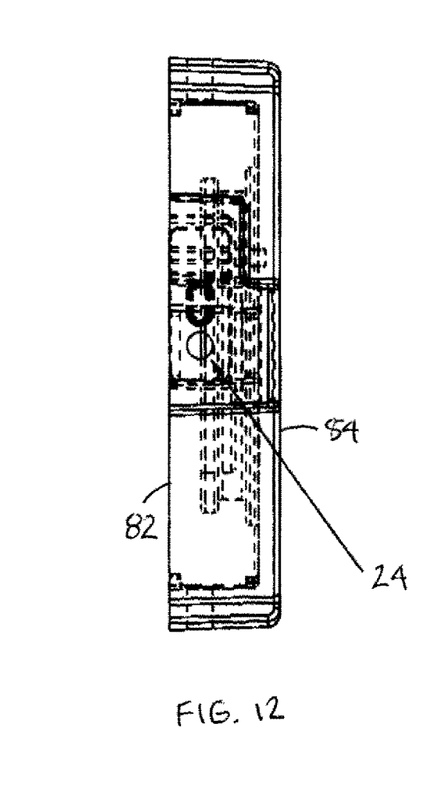
FIG. 12 is a side view of the cap of FIG. 11.

Referring to FIGS. 11 and 12, cap 10 further includes, in one 76 of four outwardly extending portions 20, a slot or groove 74 positioned parallel to out outer edge 80 of portion 76 of cap 10, the slot 74 extending to an undersurface 82 of cap 10, but not extending through an upper surface 84 of cap. Slot 74 is positioned perpendicular to an aperture 86 extending radially through region 75 of outwardly extending portion 76 of cap 10, and through slot 74. First end region 72 of spring 36 is positioned within slot 74 and second end region 78 of spring 36 extends outwardly of slot 74 and into interior 26 of cap 10. Spring 36 includes an aperture 88 (FIG. 13) aligned with aperture 86 of slot 74, such that a cam pin 24 positioned within aperture 86 of portion 76 will also extend through aperture 88 of spring 36 and retain the spring 36 within slot 74.

Figure 13:
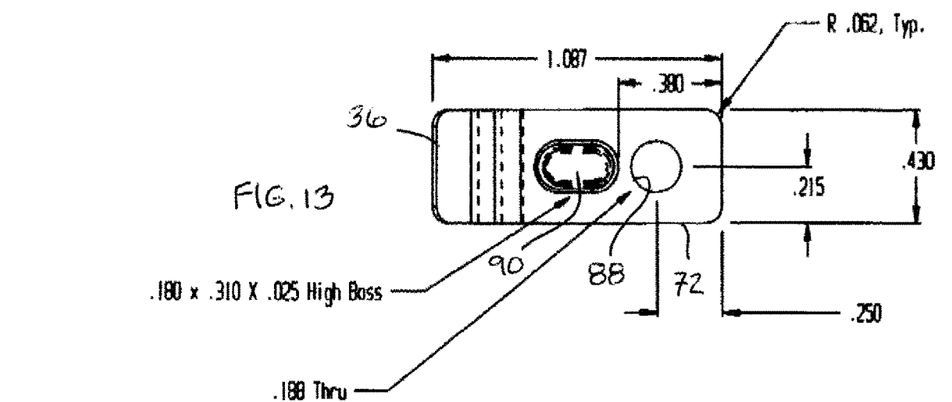
FIG. 13 is a top view of one example embodiment of a spring for use on a fuel cap.
Figure 14:
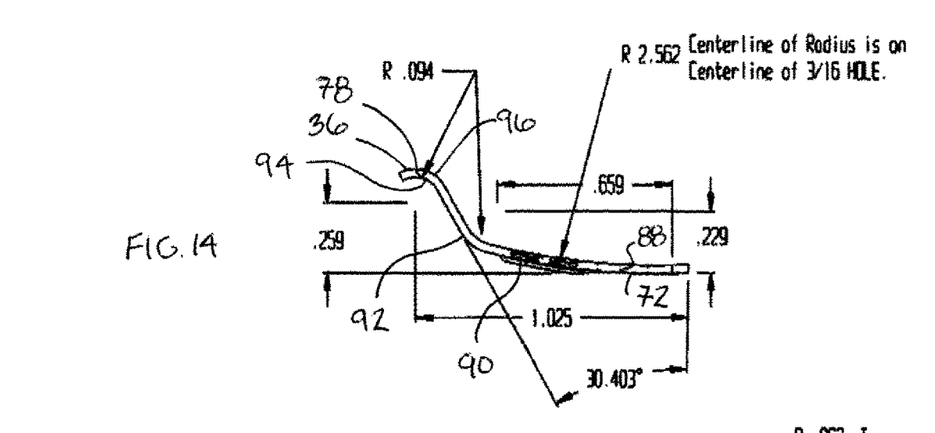
FIG. 14 is a side view of the spring of FIG. 13.

FIGS. 13 and 14 show spring 36, which includes first end region 72, also referred to as an attachment region, of the spring 36, having aperture 88 extending there through, a raised portion 90, and second end region 78. Second end region 78 is raised upwardly from first end region 72 at a bend 92 in the spring 36. Second end region 78 further includes a second bend 94 so that second end region 78 terminates in a curved region 96. Curved region 96 allows loosening of cap 10 on filler neck 22 by allowing cam ramps 44 to be moved past curved region 96 when cap 10 is rotated on filler neck 22, as will be more fully described in FIG. 15.

Figure 15:
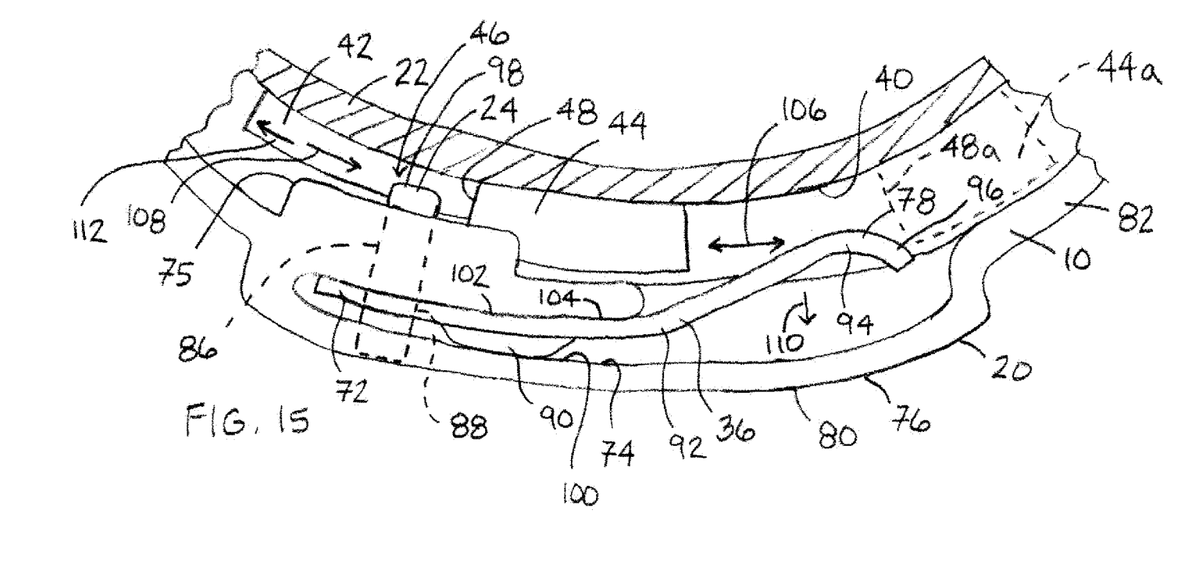
FIG. 15 is a detailed bottom view of one example embodiment of a spring positioned in a slot of a cap, the cap secured on a fuel filler neck.

FIG. 15 is a detailed bottom view of one example embodiment of a spring 36 positioned in a slot 74 of a cap 10, the cap secured on a fuel filler neck 22. Spring 36 is secured within slot 74 by a cam pin 24 that extends through aperture 88 in spring 36 and through aperture 86 in region 75 of cap 10, adjacent to slot 74. Accordingly, cam pin 24 functions to secure spring 36 within slot 74 and simultaneously provides securement of cap 10 on fuel filler neck 22 as an end 98 of cam pin 24 moves along cam ramp 44, into depression 46 and against stop surface 48 of cam ramp 44. In addition to cam pin 24, spring is securely positioned within slot 74 by raised portion 90 of spring 36 which frictionally engages a first side wall 100 of slot 74 and forces an opposite side 102 of spring 36 against a second side wall 104 of slot 74 to frictionally secure spring 36 within slot 74. When first end region 72 of spring 36 is secured within slot 74, curved region 96 of spring 36, in a nominal, unbiased position, extends outwardly from slot 74 into a pathway 106 of cam ramp 44 as cap 10 is tightened or loosened on fuel filler neck 22.

Securing cap 10 on fuel filler neck 22 will now be described. Cap 10 is first placed on fuel filler neck 22, with cam pins 24 aligned within indentations 40 of fuel filler neck 22 such that cap 10 may be fully lowered onto fuel filler neck 22. Cap 10 is then rotated in a counter clockwise direction (looking at the bottom of cap 10 as shown in FIG. 15), such that cam pins 24 will move along cam ramp 44 and toward depression 46 and stop surface 48 of the cam ramp 44.

In the initial position, with cam pins 24 aligned within indentations 40 of fuel filler neck 22, stop surface 48 of cam ramp 44 will be positioned to the right of curved region 96 of spring 36, as shown as the dashed line structure 48a and 44a in FIG. 15. As cap 10 is rotated counter clockwise relative to fuel filler neck 22, cam pin 24 is moved upwardly and along cam ramp 44 in a direction 108, and curved region 96 of spring 36 moves in direction 108 and encounters stop surface 48 of cam ramp 44. The curved region 96 of spring 36 is biased by the cam ramp 44 to move in direction 110 into slot 74 of outwardly extending region 76 of the cap 10, such that curved surface 96 of spring 36 will move past stop surface 48 and cam ramp 44 of fuel filler neck 22. Turning of cap 10 is continued in a counter clockwise direction 108 on fuel filler neck 22 until cam pins 24 each engage their respective stop surface 48 on their respective cam ramps 44. In this secured position, curved region 96 of spring 36 will have moved past cam ramp 44 and will move into its non biased position outwardly of slot 74, "behind" cam ramp 44. This nominal position of curved region 96 of spring 36, outwardly of slot 74 and into pathway 106 of cam ramp 44, will provide resistance to clockwise movement 112 of cap 10 to an open position on fuel filler neck 22, which may occur due to vehicle vibrations during normal driving conditions of the vehicle on which cap 10 is installed.

When an operator desires to remove cap 10 from fuel filler neck 22, the operator moves cap 10 in a clockwise direction 112 with respect to fuel filler neck 22 with enough force to move cam pin 24 out of depression 46 and down cam ramp 44, and with enough force to move curved region 96 of spring 36 past cam ramp 44, which will bias curved region 96 of spring 36 into slot 74. Such bending and/or biasing of spring 36 will not dislodge spring 36 from slot 74 due to the securement of spring 36 within slot 74 by cam pin 24 through aperture 88 of the spring 36, and by protrusion 90 of the spring 36 which frictionally engages first and second side walls 100 and 104 of slot 74.

Securement of a locking spring 36 in cap 10 with the use of cam pin 24 reduces the amount of raw material utilized to manufacture cap 10, compared to prior art cap designs, and also reduces the time, complexity and number of manufacturing steps to manufacture cap 10, compared to prior art locking cap designs. Securing spring 36 to cap 10 with a cam pin 24 also provides a very secure and stable securement of spring 36 on cap 10. Cam pin 24 secured spring 36, combined with the position of seal 14 on an inner radial surface 50 of fuel filler neck 22, provides a simple yet elegant cam cap design that is simple and inexpensive to manufacture, yet which provides improved sealing and fastening characteristics than prior art cap designs.

Figure 16:
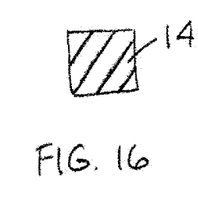
FIG. 16 is a cross sectional side view of a seal having a square cross sectional shape.

FIG. 16 is a cross sectional side view of a seal having a square cross sectional shape.

Figure 17:
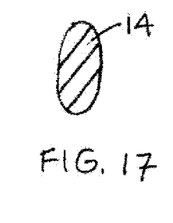
FIG. 17 is a cross sectional side view of a seal having an oval cross sectional shape.

FIG. 17 is a cross sectional side view of a seal having an oval cross sectional shape.

Figure 18:
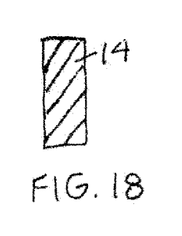
FIG. 18 is a cross sectional side view of a seal having a rectangular cross sectional shape.

FIG. 18 is a cross sectional side view of a seal having a rectangular cross sectional shape.

Figure 19:
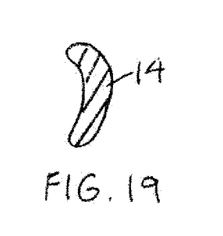
FIG. 19 is a cross sectional side view of a seal having an arcuate cross sectional shape.

FIG. 19 is a cross sectional side view of a seal having an arcuate cross sectional shape.

In the above description numerous details have been set forth in order to provide a more through understanding of the present invention. It will be obvious, however, to one skilled in the art that the present invention may be practiced using other equivalent designs.

We claim:

1. A fuel tank cap comprising:
   a body that defines a top expanse;
   a shoulder extending downwardly from said top expanse, said shoulder defining a slot therein and an interior of said body;
   a biasing member having at least a portion of said biasing member positioned within said slot;
   a fastening device extending through said shoulder, extending through said slot, and extending through said biasing member so as to secure said biasing member within said slot, and said fastening device extending inwardly into said interior of said body;
   wherein said biasing member includes a second portion extending outwardly from said slot and into said interior of said body in a nominal, unbiased condition, and wherein said second portion of said biasing member is positioned within said slot in a biased condition.

2. A cap according to claim 1 wherein said portion of said biasing member positioned within said slot includes a planar expanse and a raised region extending outwardly from said planar expanse which frictionally engages a first interior surface of said slot and biases an opposite side of said biasing member into frictional engagement with a second interior surface of said slot.

3. A cap according to claim 1 wherein said biasing member includes a biasing member aperture extending there though, and wherein said fastening device extends through said biasing member aperture.

4. A cap according to claim 1 wherein said fastening device comprises a cam pin adapted to move along a cam ramp of a fuel filler neck.

5. A cap according to claim 1 wherein said fastening device comprises a cylindrical, elongate member.

6. A cap according to claim 1 wherein said cap includes a seal, said seal having a cross sectional shape chosen from one of a square, an oval, a rectangle, and an arcuate shape.

7. A cap according to claim 1 wherein said cap defines a circular cam ramp pathway extending along and interior of said shoulder, and wherein said second portion of said biasing member extends outwardly from said slot into said cam ramp pathway in said nominal, unbiased condition, and wherein said second portion of said biasing member is positioned within said slot and removed from said cam ramp pathway in said biased condition.

8. A cap according to claim 1 wherein said biasing member comprises a leaf spring.

9. A fuel tank cap assembly comprising:
 a cap that defines a side wall, said side wall including a recess therein and defining an interior of said cap;
 a biasing device positioned at least partially within said recess; and
 an elongate member that extends through said side wall, through said recess, through said biasing device and into said interior of said cap,
 wherein said side wall defines a circular exterior shape having a plurality of gripping regions extending radially outwardly from said circular shape, said recess positioned within one of said gripping regions; and
 wherein each of said plurality of gripping regions extending radially outwardly from said circular shape includes an elongate member extending there through and into said interior of said cap.

10. An assembly according to claim 9 wherein said cap further includes a top, said top and said side wall together defining said interior of said cap, and a portion of said biasing device, in an unbiased condition, extending into said interior of said cap.

11. An assembly according to claim 9 wherein said side wall includes a bottom surface and wherein said recess extends through said bottom surface.

12. An assembly according to claim 9 wherein said biasing device includes an aperture extending there through, and wherein said elongate member extends through said aperture.

13. An assembly according to claim 9 wherein said biasing device further includes first and second opposing surfaces, said first surface including a raised portion that contacts a first wall of said recess and biases said second surface into frictional contact with a second wall of said recess.

14. A fuel tank cap assembly comprising:
 a cap that defines a side wall, said side wall including a recess therein and defining an interior of said cap;
 a biasing device positioned at least partially within said recess;
 an elongate member that extends through said side wall, through said recess, through said biasing device and into said interior of said cap;
 wherein said cap further includes a top, said top and said side wall together defining said interior of said cap, and a portion of said biasing device, in an unbiased condition, extending into said interior of said cap; and
 wherein said portion of said elongate member, in a biased condition, is moved out of said interior of said cap and into said recess.

* * * * *